United States Patent
Warren et al.

(10) Patent No.: US 12,118,687 B2
(45) Date of Patent: *Oct. 15, 2024

(54) VIRTUAL LOCATION SELECTION FOR VIRTUAL CONTENT

(71) Applicant: Magic Leap, Inc., Plantation, FL (US)

(72) Inventors: Silas Warren, Plantation, FL (US); Omar Khan, Plantation, FL (US); Samuel A. Miller, Hollywood, FL (US); Tushar Arora, Hollywood, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/523,382

(22) Filed: Nov. 29, 2023

(65) Prior Publication Data

US 2024/0096037 A1 Mar. 21, 2024

Related U.S. Application Data

(63) Continuation of application No. 17/376,748, filed on Jul. 15, 2021, now Pat. No. 11,861,796, which is a
(Continued)

(51) Int. Cl.
*G06T 19/00* (2011.01)
*G06F 3/01* (2006.01)
*G06T 19/20* (2011.01)

(52) U.S. Cl.
CPC .......... *G06T 19/006* (2013.01); *G06F 3/011* (2013.01); *G06T 19/20* (2013.01); *G06T 2200/24* (2013.01); *G06T 2219/2004* (2013.01)

(58) Field of Classification Search
CPC ... G06T 19/006; G06T 19/20; G06T 2200/24; G06T 2219/2004; G06F 3/011;
(Continued)

(56) References Cited

U.S. PATENT DOCUMENTS

| 7,758,185 B2 | 7/2010 | Lewis |
| 8,353,594 B2 | 1/2013 | Lewis |

(Continued)

FOREIGN PATENT DOCUMENTS

| CN | 103975365 A | 8/2014 |
| CN | 108604118 A | 9/2018 |

(Continued)

OTHER PUBLICATIONS

Azuma, "A Survey of Augmented Reality," Presence: Teleoperators and Virtual Environments, Aug. 1997, 6(4):355-385.
(Continued)

*Primary Examiner* — Chong Wu
(74) *Attorney, Agent, or Firm* — Fish & Richardson P.C.

(57) ABSTRACT

A method for placing content in an augmented reality system. A notification is received regarding availability of new content to display in the augmented reality system. A confirmation is received that indicates acceptance of the new content. Three dimensional information that describes the physical environment is provided, to an external computing device, to enable the external computing device to be used for selecting an assigned location in the physical environment for the new content. Location information is received, from the external computing device, that indicates the assigned location. A display location on a display system of the augmented reality system at which to display the new content so that the new content appears to the user to be displayed as an overlay at the assigned location in the physical environment is determined, based on the location information. The new content is displayed on the display system at the display location.

20 Claims, 3 Drawing Sheets

Related U.S. Application Data continuation of application No. 16/909,489, filed on Jun. 23, 2020, now Pat. No. 11,094,133.

(60) Provisional application No. 62/865,756, filed on Jun. 24, 2019.

(58) Field of Classification Search
CPC ...... G06F 3/012; G06F 3/013; G06F 3/04815; G02B 2027/014; G02B 27/0101
See application file for complete search history.

(56) References Cited

U.S. PATENT DOCUMENTS

| | | | |
|---|---|---|---|
| 8,696,113 | B2 | 4/2014 | Lewis |
| 8,733,927 | B1 | 5/2014 | Lewis |
| 8,733,928 | B1 | 5/2014 | Lewis |
| 9,010,929 | B2 | 4/2015 | Lewis |
| 9,235,064 | B2 | 1/2016 | Lewis |
| 9,239,473 | B2 | 1/2016 | Lewis |
| 9,244,293 | B2 | 1/2016 | Lewis |
| 9,658,473 | B2 | 5/2017 | Lewis |
| 10,151,937 | B2 | 12/2018 | Lewis |
| 10,185,147 | B2 | 1/2019 | Lewis |
| 11,094,133 | B2 * | 8/2021 | Warren ................ G06T 19/20 |
| 11,861,796 | B2 * | 1/2024 | Warren ................ G06F 3/011 |
| 2012/0075168 | A1 | 3/2012 | Osterhout et al. |
| 2012/0249416 | A1 | 10/2012 | Maciocci et al. |
| 2014/0365569 | A1 | 12/2014 | Vyrros et al. |
| 2015/0193982 | A1 | 7/2015 | Mihelich et al. |
| 2016/0034042 | A1 | 2/2016 | Joo |
| 2016/0133230 | A1 | 5/2016 | Daniels et al. |
| 2018/0114372 | A1 | 4/2018 | Nagy et al. |
| 2019/0004683 | A1 | 1/2019 | Pahud et al. |
| 2019/0026936 | A1 | 1/2019 | Gorur Sheshagiri et al. |
| 2019/0075254 | A1 | 3/2019 | Jhawar et al. |
| 2019/0094981 | A1 | 3/2019 | Bradski et al. |
| 2020/0402316 | A1 | 12/2020 | Warren et al. |

FOREIGN PATENT DOCUMENTS

| | | |
|---|---|---|
| JP | 2020520498 A | 7/2020 |
| WO | 2014045683 A1 | 3/2014 |
| WO | 2018204419 A1 | 11/2018 |

OTHER PUBLICATIONS

Azuma, "Predictive tracking for augmented reality." Dissertation for the degree of Doctor of Philosophy, University of North Carolina at Chapel Hill, Department of Computer Science, Feb. 1995, 262 pages.
Bimber et al., "Spatial Augmented Reality Merging Real and Virtual Worlds," A K Peters, Ltd. (ed.), 2005, 393 pages.
Extended European Search Report in European Appln. No. 20831525.9, dated Aug. 12, 2022, 11 pages.
Hitl.washington.edu [online], "Hardware," available on or before Oct. 13, 2005, via Internet Archive: Wayback Machine URL <https://web.archive.org/web/20051013062315/http:/www.hitl.washington.edu:80/artoolkit/documenta tion/hardware.htm>, retrieved on Mar. 3, 2021, URL <http://www.hitl.washington.edu/artoolkit/documentation/hardware.htm>, 3 pages.
Jacob, "Eye Tracking in Advanced Interface Design," Virtual environments and advanced interface design, 1995, 258:288, 50 pages.
PCT International Search Report and Written Opinion in International Appln. No. PCT/US2020/039151, dated Sep. 4, 2020, 10 pages.
Tanriverdi et al., "Interacting with Eye Movements in Virtual Environments," Proc. of the SIGCHI Conference on Human Factors in Computing Systems, 2000, pp. 265-272.
Natsume et al., "Let's dive into the world of VR (Virtual Reality)!," HiVi, Oct. 17, 2016, 34:52-64, 28 pages (with English machine translation).
Notice of Allowance in Japanese Appln. No. 2021-576036, dated Jun. 18, 2024, 6 pages (with English translation).
Takada et al., "Development of the Gazes Heat Map in Internet Broadcast using an Omnidirectional Camera," Symposium on Multimedia, Distributed, Cooperative and Mobile (DICOMO2017), Jun. 2017, 23 pages (with English machine translation).
Office Action in Chinese Appln. No. 202080046167.5, dated Aug. 12, 2024, 20 pages (with English translation).

* cited by examiner

VIRTUAL LOCATION SELECTION FOR VIRTUAL CONTENT

CROSS-REFERENCE TO RELATED APPLICATIONS

This application is a continuation of U.S. patent application Ser. No. 17/376,748, filed Jul. 15, 2021, which is a continuation of U.S. patent application Ser. No. 16/909,489, filed Jun. 23, 2020, now U.S. Pat. No. 11,094,133, which claims the benefit of U.S. Provisional Pat. App. No. 62/865,756, filed Jun. 24, 2019, all of which are incorporated by reference herein.

FIELD

This specification generally relates to mixed reality (MR) devices.

BACKGROUND

A typical way to view content on a conventional device is to open an application that can display the content on a display screen (e.g., a monitor of a computer, smartphone, tablet, etc.). A user can navigate to the application to view the content. Normally, when the user is looking at the display screen of the display, there is a fixed format as to how the content is displayed within the application and on the display screen of the display device.

SUMMARY

Innovative aspects of the subject matter described in this specification relate to placement of content in augmented reality (AR) systems.

With virtual reality (VR), augmented reality (AR), and/or mixed reality (MR) systems, an application can display content in a spatial three-dimensional (3D) environment. In particular, a location of a content item can be selected in response to receiving a notification of an availability of a new content stream. Thus, according to one general implementation, a user can use a mobile device as a controller to select a location for virtual display of the new content item. A representation of the user's environment can be displayed on the mobile device, and the user can select a location within the representation as corresponding to a location in the user's physical environment at which to virtually display the new content. An indication of the user's selected location can be provided by the mobile device to the AR system. In response to receiving location information from the mobile device, the AR system can virtually display the new content stream so that the new content stream appears to the user as an overlay at the selected location in the user's physical environment.

According to implementations described, a notification is received regarding availability of new content to display in an augmented reality system. The augmented reality system is configured to present content on a display system so that the content appears to a user to be affixed at an assigned location in a physical environment of the user. A confirmation input is received that indicates acceptance of the new content. In response to receiving the confirmation input, three dimensional information that describes the physical environment is provided, to an external computing device external to the augmented reality system, to enable the external computing device to be used for selecting an assigned location in the physical environment for the new content. Location information is received, from the external computing device, that indicates the assigned location in the physical environment for the new content. A display location on the display system at which to display the new content so that the new content appears to the user to be displayed as an overlay at the assigned location in the physical environment is determined, based on the location information. The new content is displayed on the display system at the display location.

The described content placement approach is advantageous in that a user can use a mobile device as a controller for an AR system. The mobile device can receive 3D information from the AR system and display a representation of the user's environment that enables selection of virtual display locations for new and existing content. A user can select a location for virtual display of new content using the representation of the user's environment and the AR system can virtually display the new content as an overlay at a physical location corresponding to the location selected using the representation of the environment.

Other implementations of this aspect include corresponding systems, apparatus, and computer programs recorded on computer storage devices, each configured to perform the operations of the methods.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
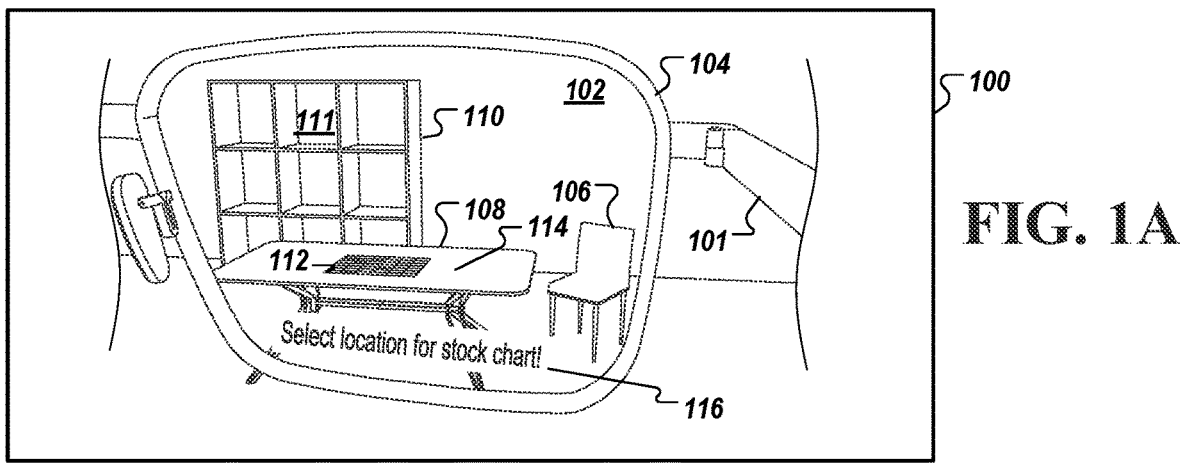
FIG. 1A illustrates a scene of a room in which a head-mounted AR system is used.

FIG. 1A illustrates a scene of a room 100 in which a head-mounted AR system 101 is used. The head-mounted AR system 101 may be a mixed reality device that presents to the user an interface for interacting with and experiencing a mixed reality world. The mixed reality world can include computer-generated content and real world physical objects in the user's physical environment. The head-mounted AR system 101 can provide images of virtual objects intermixed with physical objects in a field of view of the user, for example.

The mixed reality world can be seen by the user through eye piece(s) of the head-mounted AR system 101. For example, a monocular eye view 102 as seen through a right eye piece 104 of the head-mounted AR system 101 is shown. The eye pieces (including the right eye piece 104) of the head-mounted AR system 101 can be at least partially transparent and serve as "optical see-through" displays through which the user can view real objects in the user's physical environment. The user's physical environment is the physical surroundings of the user as the user moves about and views real world objects through the head-mounted AR system 101. For example, the user's physical environment, as seen in the monocular eye view 102, includes a chair 106, a table 108, and bookshelves 110. The bookshelves 110 are cubicle shelves that include a grid of individual shelves, including a shelf 111.

The head-mounted AR system 101 can be configured to present to the user, through the eye pieces of the head-mounted AR system 101, virtual content that can be perceived as augmentations to physical reality. For example, the head-mounted AR system 101 can produce images of virtual objects which are transposed onto partially transparent physical surfaces. For instance, virtual content 112 can be virtually displayed, through the eye pieces of the head-mounted AR system 101, on a top surface 114 of the table 108, when the head-mounted AR system 101 determines that the table 108 is within a field of view of the head-mounted AR system 101. Virtual displaying of content, as described herein, refers to displaying content on a display system or device (such as the right eye piece 104), such that the content appears to the user to be displayed as an overlay at a particular three dimensional location in the physical environment. The head-mounted AR system 101 can be configured such that when the user turns their head or looks up or down, display devices within the head-mounted AR system 101 continue to render the virtual content 112 so that it appears to remain affixed to the top surface 114 of the table 108.

Virtual content may include or correspond to web pages, blogs, digital pictures, videos, news articles, newsletters, or music, to name a few examples. Virtual digital content may correspond to content stored on a storage device that is accessible by the head-mounted AR system 101 or virtual content may be a presentation of streaming content, such as a live video feed. Multiple items of virtual content may be virtually displayed on multiple, different physical surfaces in the room 100, to increase an overall workspace area for the user onto which virtual content may be displayed. Various planar surfaces may be designated as virtual displays, for example.

The head-mounted AR system 101 can determine that a new content item is available for virtual display by the head-mounted AR system 101. The head-mounted AR system 101 can make an internal determination that new content is available and/or may receive a notice from an external system that new content is available. The head-mounted AR system 101 may subscribe to a bot or another content source, for example.

The new content may be various types of pushed content. Pushed content can be content that can be rendered into the user's environment without the user having to search for or select the content. For example, pushed content may include (a) notifications from various applications such as stock notifications, newsfeeds, etc.; (b) prioritized content, for example, updates and notifications from social media applications, email updates, or messages from contacts; (c) messages targeting broad target groups and/or specific target groups; or d) other types of content or content streams.

In response to determining that a new content item is available for virtual display, a notification 116 can be displayed to the user. The notification 116 indicates that a new stock chart content item is available. The notification 116 is also prompting the user to select a location within the physical environment upon which to virtually display the new stock chart.

The notification 116 can be virtually displayed to the user by the head-mounted AR system 101. The notification 116 can be shown on a particular physical surface within the room 100, or can be displayed as if appearing "in space." As another example, the notification 116 can be displayed within the monocular eye view 102 relative to one or more edges of the eye piece 104. Other examples include the notification 116 being displayed on a physical display of a computing device (not shown) or as an audio notification to the user (e.g., as played through speakers of the head-mounted AR system 101 or another connected computing device).

The user can configure various settings for controlling the display of the notification 116 and other new content notices. For instance, the user can configure a particular location (e.g., physical surface, physical computing device display) on which to virtually display new content notifications. As another example, the user can configure notification frequency (e.g., display immediately, display periodically) and content type(s) for which to display notices.

The user can interact with the notification 116 to indicate acceptance/confirmation of the notification 116 and/or to initiate selection of a location (e.g., within the physical environment of the room 100) on which to virtually display the new content or content stream. The user can select a particular location in a variety of ways. One approach for selecting a location is by using a user interface displayed on a mobile device of the user.

Figure 1B:
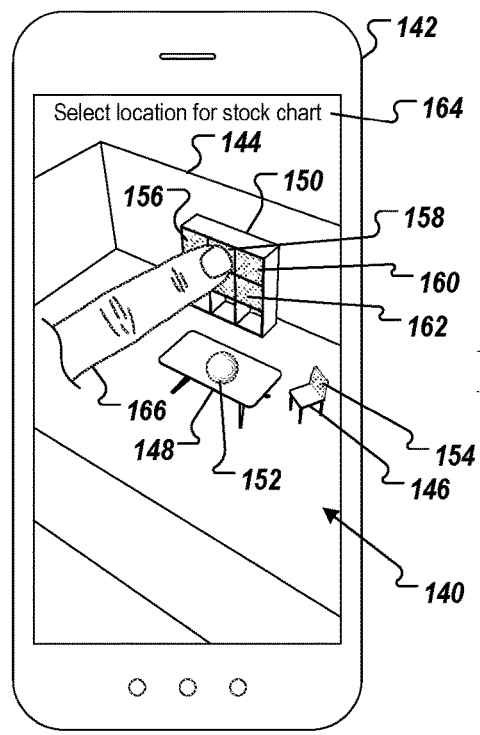
FIG. 1B illustrates an example mobile device user interface.

FIG. 1B illustrates an example mobile device user interface 140. The user interface 140 can be displayed on a user device 142 of a user in response to a user receiving a notification (e.g., the notification 116 described above with respect to FIG. 1A) for a new content item that can be displayed in an AR environment.

The user interface 140 displays a spatial three-dimensional (3D) environment that includes a 3D model 144 of the room 100 described above with respect to FIG. 1A. The 3D model 144 can be a simplified geometric model of the room 100. For example, the 3D model 144 can be a digital 3D planar map (e.g., a "mini map") of the room 100.

The 3D model 144 can be a static preconstructed representation of the room 100. As another example, the 3D model 144 can be generated in near real time based on information generated by the head-mounted AR system 101 of FIG. 1A. For instance, the head-mounted AR system 101 can generate and send 3D model information that can be used by the user device 142 to display the 3D model 144. In some implementations, the head-mounted AR system 101 can respond to changes in head-pose and/or eye movements of the user and can send updated 3D model information to the user device 142, so that an updated 3D model 144 can be displayed in the user interface 140 (e.g., with the updated 3D model 144 representing a view of the room 100 from the current perspective of the user).

The user interface 140, which can present a simplified, processed view of the room 100, can include representations of physical objects in the room 100. For example, the user interface 400 includes a chair object 146, a table object 148, and a bookshelves object 150 corresponding to the chair 106, the table 108, and the bookshelves 110, respectively. The user can zoom and pan the user interface 140 to focus on a particular area of the 3D model 144.

The user device 140 can be used as a controller, control panel, and/or navigator for the AR environment. For instance, the user can interact with the user interface 140 for placement of virtual content. Existing virtual content can be represented in the user interface 140 by an object or icon.

For instance, the virtual content 112 of FIG. 1A is represented in the user interface 140 as an icon 152. The user can select the icon 152 and drag the icon 152 to another location within the user interface 140. In response to a moving of the icon 152 to another location within the user interface 140, the virtual content 112 can be displayed as an overlay at a corresponding location within the AR environment as seen by the user using the head-mounted AR system 101.

In some implementations, certain surfaces of objects in the user interface 140 are identified (by the user device 142 or the head-mounted AR system 101) as suggested surfaces for content placement. For instance, a chair back 154 of the chair object 146 can be shown in a highlighted manner (e.g., in a particular color) to indicate that the back of the chair 106 is a recommended location for content. As another example, certain shelves of the top two rows of the bookshelves object 150 can be highlighted, such as shelves 156, 158, 160, and 162, to indicate that corresponding individual shelves of the bookshelves 110 are suitable for placing content. The lower row of shelves of the bookshelves 110 might not be identified as suggested locations for content, since the head-mounted AR system 101 may determine that the lower row of shelves of the bookshelves 110 are not currently visible to the user (e.g., the table 108 may block a view of the lower shelves). In general, suggested surfaces can be determined based on a variety of factors, including field of view with respect to current head-pose or eye gaze, surface contour, surface texture, surface size, type of content that may be placed on the surface (e.g., type(s) of existing or new content), or whether the surface is currently occupied by virtual content.

In some implementations, suggested surfaces are highlighted in response to a notification of new content, as surfaces that may be amenable for virtual display of the new content. For example, suggested surfaces can be highlighted in the user interface in response to a notification 164 that instructs the user to select a location for a new stock chart content item. The notification 164 corresponds to the notification 116 and can be displayed automatically in the user interface 140 in conjunction with the display of the notification 116 within the view 102 or in response to user interaction with (e.g., confirmation of) the notification 116.

The user can, in response to the notification 164, select a surface of a particular object in the user interface 140 as a location for virtual display of the new stock chart. The user can select a suggested surface, some other surface, or some other location within the 3D model 144, such as a location that represents a location "floating in space" in the room 100. As shown by a finger 166 of the user, the user selects the shelf 158 of the bookshelves object 150, to indicate that the shelf 111 of the bookshelves 110 is a selected location for virtual display of the new stock chart.

An indication of the selection of the shelf 158 of the bookshelves object 150 can be transmitted to the head-mounted AR system 101. For example, 3D information such as coordinates, region identifier, etc. of the shelf 158 can be sent to the head-mounted AR system 101.

In some implementations, in response to selection of the shelf 158 as the location for virtual display of the new stock chart, a new icon representing the new stock chart is displayed in the user interface 140, in/on the shelf 158. In some implementations, in response to (or in conjunction with) the display of the notification 164, an icon representing the new stock chart is displayed at an initial/default location within the user interface 140. The user can move the new icon to a desired location, to finalize selection of the location for the new stock chart. The initial/default location can be, for example, the center of the user interface 140, a particular suggested surface, such as a surface that has a highest suitability score, or a surface or location that is selected based on a configured user preference. If a new icon is displayed representing the new stock chart, the new icon can have a different appearance (e.g., different color, flashing, other emphasis) from the icon 152, at least until the user finalizes a location for the new stock chart.

The user interface 140 can be configured such that when moving an icon to a particular surface, the icon "snaps" to the surface. As another example, the user can move an icon by using a "drag and drop" operation, and in some cases, a user can confirm an end destination/location after the drag and drop operation has completed.

In response to selection of the shelf 158, the notification 164 can be removed from the user interface 140. In some implementations, a selection confirmation notice (e.g., "stock chart location confirmed," "thank you for selecting the location of the stock chart") is displayed in response to selection of the shelf 158. After selection of the shelf 158, the 3D model 144 can remain displayed in the user interface 140, to enable the user to perform other interactions with the AR environment, to receive future notifications of new content, etc.

Figure 1C:
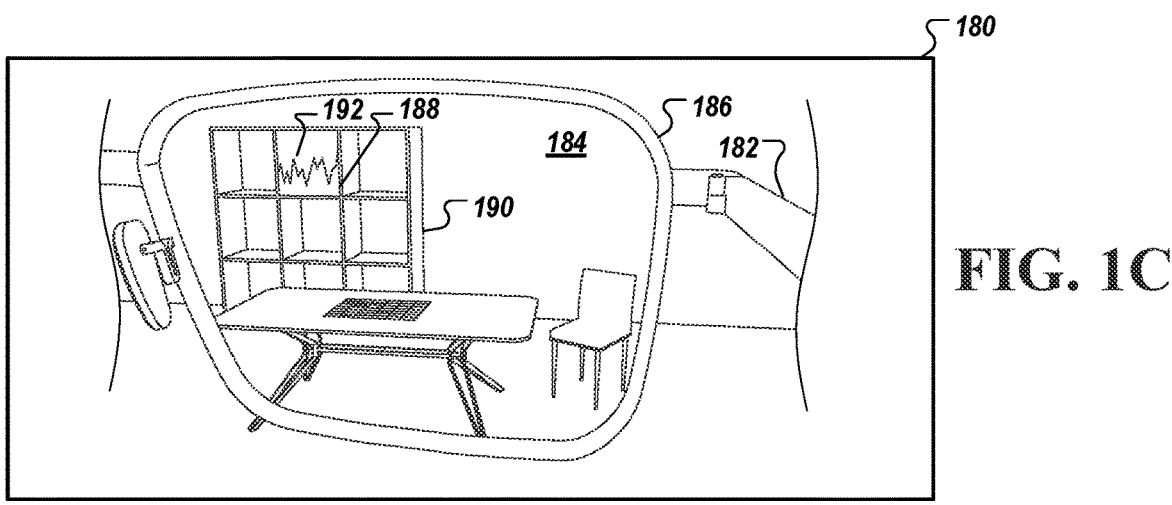
FIG. 1C illustrates an updated scene of a room in which a head-mounted AR system virtually displays a new content item.

FIG. 1C illustrates an updated scene of a room 180 in which a head-mounted AR system 182 virtually displays a new content item. The room 180 corresponds to the room 100, and a view 184 seen through an eye piece 186 of a head-mounted AR system 182 has been updated in response to selection of a location at which to virtually display a new content item. For instance, the head-mounted AR system 182 can receive information indicating user selection of the shelf 158 in the user interface 140 of FIG. 1B.

The head-mounted AR system 182 can, in response to receiving information indicating user selection of the shelf 158 as a location for a new stock chart content item, identify a shelf 188 of bookshelves 190 as corresponding to the shelf 158 of the bookshelves object 150. The head-mounted AR system 182 can virtually display a virtual stock chart content item 192 in/on the shelf 188. For example, the virtual stock chart content item 192 can be rendered and superimposed substantially over the real world shelf 188, so that the virtual stock chart content item 192 appears to the user to be displayed as an overlay on top of the shelf 188.

The head-mounted AR system 182 can maintain a one to one mapping of the shelf 188 to the virtual stock chart content item 192. Using the head-mounted AR system 182, the user can view the virtual stock chart content item 192 as if it appears on the mapped/matched shelf 188. The virtual stock chart content item 192 can be displayed to appear as physically attached on the shelf 188, through projection and as perceived by the user.

Figure 2:
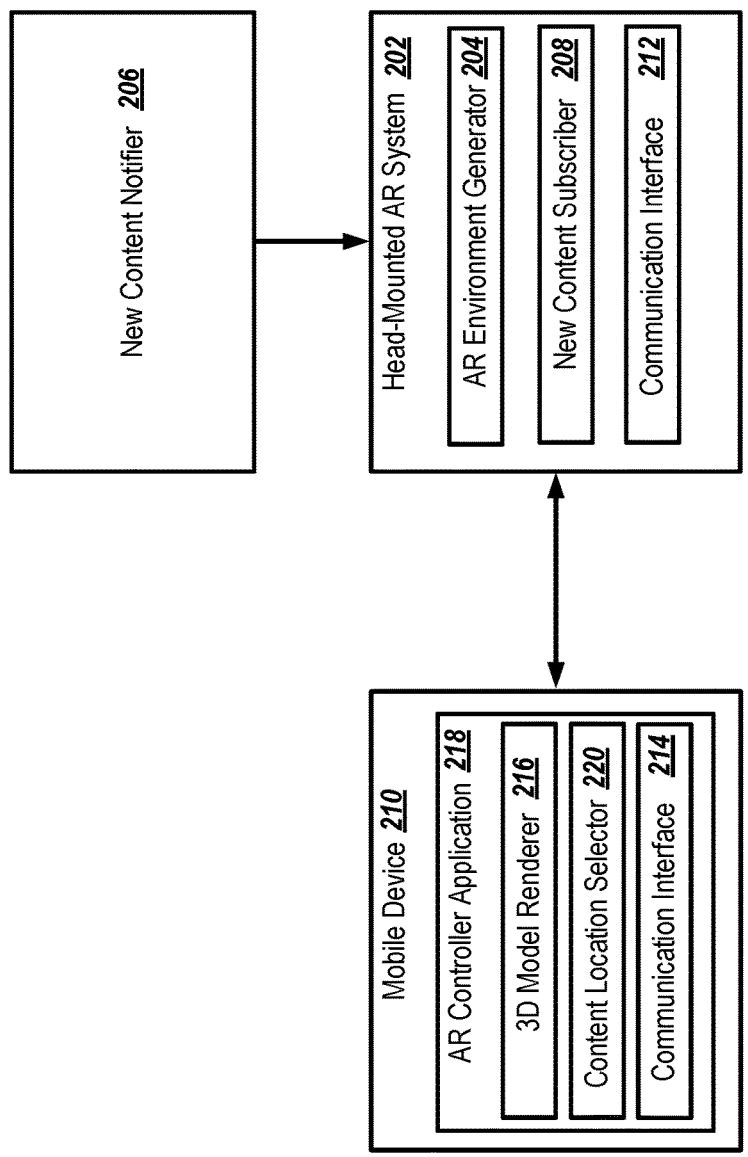
FIG. 2 illustrates an example implementation of an AR system that includes mobile device integration.

FIG. 2 illustrates an example implementation of an AR system 200 that includes mobile device integration. A head-mounted AR system 202 can be configured to present to a user virtual content that can be perceived as augmentations to physical reality. For example, an AR environment generator 204 can provide images of virtual objects that can be intermixed with physical objects in a field of view of the user.

The head-mounted AR system 202 can receive a notification from a new content notifier 206 that a new content item is available for virtual display by the head-mounted AR system 202. A new content subscriber 208 can subscribe to and receive notifications from the new content notifier 206, for example. As another example, the head-mounted AR system 202 can make an internal determination that new content is available for virtual display to the user.

The AR environment generator 204 can generate a virtual content item for displaying the new content by the head-mounted AR system 202. The virtual content item can be displayed by the head-mounted AR system 202 so that it virtually appears to the user at a default location or the virtual content item can be displayed so that it virtually appears to the user at a user-selected location. The head-mounted AR system 202 can send information to a mobile device 210, using a communication interface 212, to enable the user to use the mobile device 210 to select a location within the environment of the user for virtually displaying the virtual content item. The AR environment Generator 204 can generate 3D information about the environment of the user and the 3D information can be sent to the mobile device 210 using the communication interface 212. The head-mounted AR system 202 can also send information about the new content item (e.g., a description of the content) and a request for selection of a location for the new content item.

The mobile device 210 can receive, using a communication interface 214, the 3D information about the user's environment and the information about the new content item. A 3D model renderer 216 of an AR controller application 218 can render a 3D representation of the user's environment within the AR controller application 218. The 3D representation can include representations of physical objects within the environment and, if applicable, representations of existing virtual content that are currently being virtually displayed by the head-mounted AR system 202 in the user's environment.

The AR controller application 218 can display an instruction to the user to select a location for virtual display of the new content item. A content location selector 220 can enable the user to select a location on the 3D representation of the user's environment, as corresponding to a location for virtual display of the new content item. The location can be a surface of a rendered object that corresponds to a physical object in the user's environment or the location can be 3D coordinates that may or may not correspond to a physical object.

The AR controller application 218 can send, using the communication interface 214, location information for the selected location of the new content item to the head-mounted AR system 202. The location information can be 3D coordinates, region information, object information, or other types of information or identifiers. The AR environment generator 204 can present or project the virtual content item so that the virtual content item appears to the user to be located at a location in the user's physical environment that corresponds to the location information received from the mobile device 210.

Figure 3:
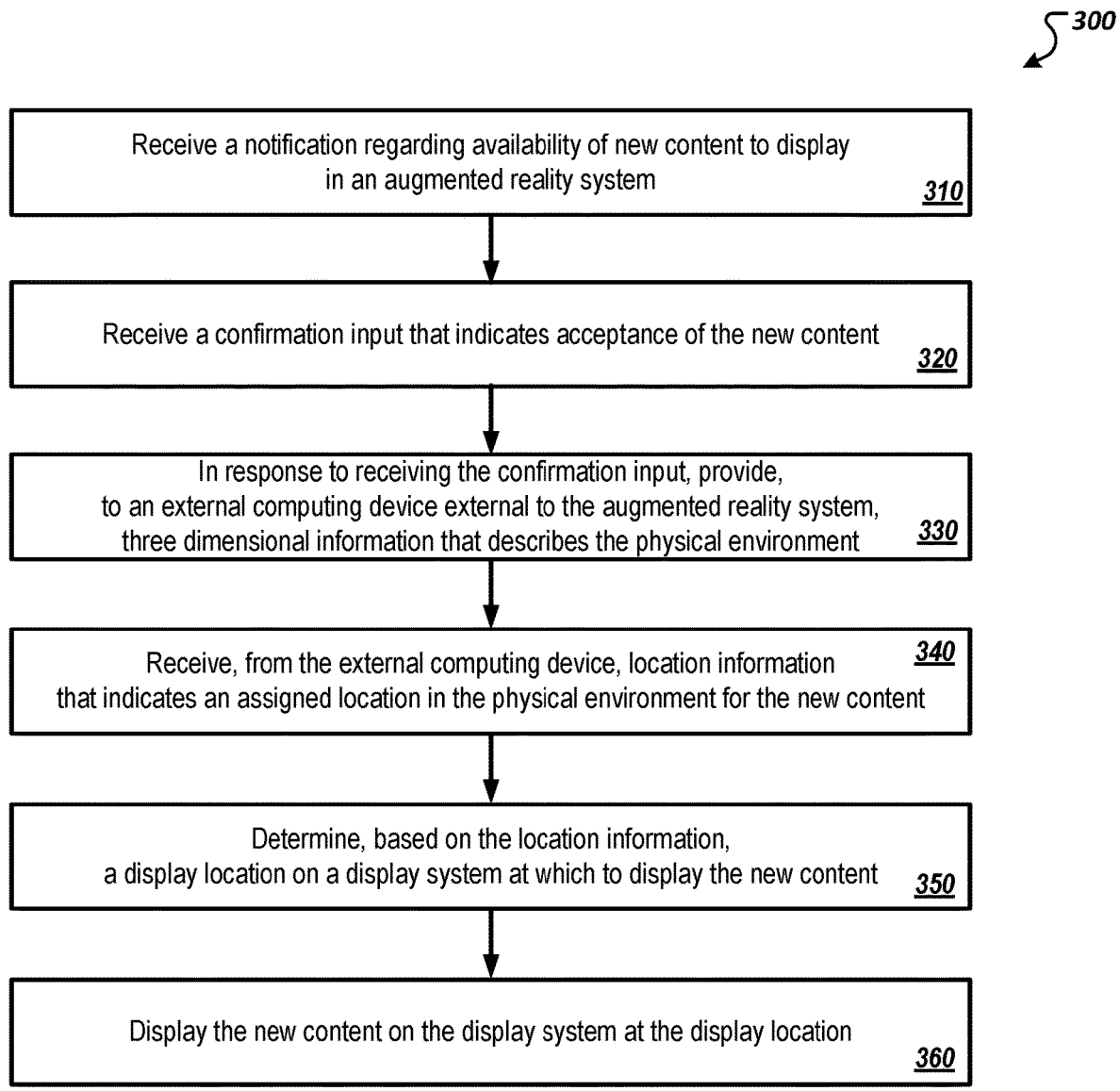
FIG. 3 depicts a flow chart of a method for displaying content within an AR system.

FIG. 3 depicts a flow chart of a method 300 for displaying content within an AR system. A notification regarding availability of new content to display in an augmented reality system is received (310). The augmented reality system is configured to present content on a display system so that the content appears to a user to be affixed at an assigned location in a physical environment of the user. The notification can be received from an external source that is external to the augmented reality system. As another example, the notification can be received as a result of an internal determination by the augmented reality system that new content is available. The notification can be displayed on the display system.

A confirmation input that indicates acceptance of the new content is received (320). The confirmation input can be an interaction with the notification, a voice command, or some other type of input. The notification can be removed from the display system in response to receiving the confirmation input.

In response to receiving the confirmation input, three dimensional information that describes the physical environment is provided to an external computing device external to the augmented reality system (330). The three dimensional information can be provided to enable the external computing device to be used for selecting an assigned location in the physical environment for the new content. The external computing device can be a mobile device or some other type of computing device.

The three dimensional information can include three dimensional information for candidate assigned locations for the new content. The candidate assigned locations can be locations that are determined to be suitable for overlaying a display of the new content. Candidate assigned locations can correspond to physical surfaces in the physical environment. The three dimensional information can include assigned locations of existing content currently being displayed on the display system.

The three dimensional representation can correspond to a static representation of the physical environment. As another example, the three dimensional information can correspond to a current perspective of the user as seen through the display system. Updated three dimensional information can be generated and provided to the external computing device in response to detection of a change in user perspective.

Location information that indicates the assigned location in the physical environment for the new content is received, from the external computing device (340). The location information can be 3D coordinates, region identifier(s), object identifiers, or some other type of location information. The location information can correspond to a location the user selects on a three dimensional representation of the physical environment that is displayed on the external computing device.

A display location is determined, based on the location information (350). The display location is a location on the display system at which to display the new content so that the new content appears to the user to be displayed as an overlay at the assigned location in the physical environment.

The new content is displayed on the display system at the display location (360).

Additionally or alternatively, an updated assigned location for a first existing content item can be received from the external computing device. An updated display location on the display system can be determined, based on the updated assigned location. The first existing content item can be displayed on the display system at the updated display location, so that the first existing content item appears to the user to be displayed as an updated overlay at the updated assigned location in the physical environment.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented using one or more computer programs or non-transitory computer-readable storage media that includes instructions that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example, semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

Computer-readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program, also known as a program, software, software application, script, plug-in, or code, may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data in a single file dedicated to the program in question, or in multiple coordinated files. A computer program may be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

Elements of a computer may include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer may not have such devices. Moreover, a computer may be embedded in another device, e.g., a tablet computer, a mobile telephone, a personal digital assistant (PDA), a mobile audio player, a VAR system, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and may even be claimed as such, one or more features from a claimed combination may, in some cases, be excised from the combination, and the claimed combination may be directed to a sub-combination or variation of a sub-combination. For example, although the mapping operation is described as a series of discrete operations, the various operations may be divided into additional operations, combined into fewer operations, varied in order of execution, or eliminated, depending on the desired implementation.

Similarly, the separation of various system components in the embodiments described above should not be understood as requiring such separation in all embodiments, and it should be understood that the described program components and systems may generally be integrated together in a single software product or packaged into multiple software products. For example, although some operations are described as being performed by a processing server, one of more of the operations may be performed by the smart meter or other network components.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together. The term "and/or" is also intended to be construed in this manner.

The use of the terms "first," "second," "third," etc., are not necessarily used herein to connote a specific order or number of elements. Generally, the terms "first," "second," "third," etc., are used to distinguish between different elements as generic identifiers. Absent a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

What is claimed is:

1. A computer-implemented method, comprising:
   providing, for display by an augmented reality system, a notification on the augmented reality system indicating that new content is available;
   in response to receiving a confirmation input from a user, removing, by the augmented reality system, the notification from display on the augmented reality system;
   providing, by the augmented reality system and to a mobile device of a user of the augmented reality system, information that describes a physical environment surrounding the user;
   providing, by the augmented reality system, the new content for display on a display of the augmented reality system at a display location based on location information received from a mobile device of the user of the augmented reality system indicating an assigned location within the physical environment that the user has selected for new content to appear to the user to be displayed;
   receiving, from the mobile device of the user of the augmented reality system, an updated assigned location for the new content to be displayed; and
   determining, by the augmented reality system and based on the updated assigned location, an updated display location on the display of the augmented reality system at which to display the new content so that the new content appears to the user to be displayed as an updated overlay at the updated assigned location in the physical environment.

2. The computer-implemented method of claim 1, wherein the mobile device of the user with which the user indicates the assigned location is a mobile telephone of the user.

3. The computer-implemented method of claim 1, comprising:
   generating, by the augmented reality system, a notification based on the augmented reality system receiving data from an external source that is external to the augmented reality system and indicating that the new content is available.

4. The computer-implemented method of claim 1, comprising:
   receiving, by the augmented reality system and from the mobile device of the user of the augmented reality system, the location information.

5. The computer-implemented method of claim 1, comprising:
   determining, by the augmented reality system and based on the location information, the display location.

6. The computer-implemented method of claim 1, comprising:
   identifying candidate locations in the physical environment for display of the new content, wherein information provided to the mobile device identifies the candidate locations.

7. The computer-implemented method of claim 1, wherein the information provided to the mobile device comprises a static representation of the physical environment surrounding the user.

8. A non-transitory, computer-readable medium storing one or more instructions executable by a computer system to perform one or more operations, comprising:
   providing, for display by an augmented reality system, a notification on the augmented reality system indicating that new content is available;
   in response to receiving a confirmation input from a user, removing, by the augmented reality system, the notification from display on the augmented reality system;
   providing, by the augmented reality system and to a mobile device of a user of the augmented reality system, information that describes a physical environment surrounding the user;
   providing, by the augmented reality system, the new content for display on a display of the augmented reality system at a display location based on location information received from a mobile device of the user of the augmented reality system indicating an assigned location within the physical environment that the user has selected for new content to appear to the user to be displayed;
   receiving, from the mobile device of the user of the augmented reality system, an updated assigned location for the new content to be displayed; and
   determining, by the augmented reality system and based on the updated assigned location, an updated display location on the display of the augmented reality system at which to display the new content so that the new content appears to the user to be displayed as an updated overlay at the updated assigned location in the physical environment.

9. The non-transitory, computer-readable medium of claim 8, wherein the mobile device of the user with which the user indicates the assigned location is a mobile telephone of the user.

10. The non-transitory, computer-readable medium of claim 8, comprising:
generating, by the augmented reality system, a notification based on the augmented reality system receiving data from an external source that is external to the augmented reality system and indicating that the new content is available.

11. The non-transitory, computer-readable medium of claim 8, comprising:
receiving, by the augmented reality system and from the mobile device of the user of the augmented reality system, the location information.

12. The non-transitory, computer-readable medium of claim 8, comprising:
determining, by the augmented reality system and based on the location information, the display location.

13. The non-transitory, computer-readable medium of claim 8, comprising:
identifying candidate locations in the physical environment for display of the new content, wherein information provided to the mobile device identifies the candidate locations.

14. The non-transitory, computer-readable medium of claim 8, wherein the information provided to the mobile device comprises a static representation of the physical environment surrounding the user.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations, comprising:
providing, for display by an augmented reality system, a notification on the augmented reality system indicating that new content is available;
in response to receiving a confirmation input from a user, removing, by the augmented reality system, the notification from display on the augmented reality system;
providing, by the augmented reality system and to a mobile device of a user of the augmented reality system, information that describes a physical environment surrounding the user;
providing, by the augmented reality system, the new content for display on a display of the augmented reality system at a display location based on location information received from a mobile device of the user of the augmented reality system indicating an assigned location within the physical environment that the user has selected for new content to appear to the user to be displayed;
receiving, from the mobile device of the user of the augmented reality system, an updated assigned location for the new content to be displayed; and
determining, by the augmented reality system and based on the updated assigned location, an updated display location on the display of the augmented reality system at which to display the new content so that the new content appears to the user to be displayed as an updated overlay at the updated assigned location in the physical environment.

16. The computer-implemented system of claim 15, wherein the mobile device of the user with which the user indicates the assigned location is a mobile telephone of the user.

17. The computer-implemented system of claim 15, comprising:
generating, by the augmented reality system, a notification based on the augmented reality system receiving data from an external source that is external to the augmented reality system and indicating that the new content is available.

18. The computer-implemented system of claim 15, comprising:
receiving, by the augmented reality system and from the mobile device of the user of the augmented reality system, the location information.

19. The computer-implemented system of claim 15, comprising:
determining, by the augmented reality system and based on the location information, the display location.

20. The computer-implemented system of claim 15, comprising:
identifying candidate locations in the physical environment for display of the new content, wherein information provided to the mobile device identifies the candidate locations.

* * * * *